US005588770A

United States Patent [19]

Bart

[11] Patent Number: 5,588,770

[45] Date of Patent: Dec. 31, 1996

[54] QUICK RELEASE AND ADJUSTABLE PALLET ASSEMBLY FOR TEXTILE SCREEN PRINTING MACHINE

[75] Inventor: Mark Bart, DesPlaines, Ill.

[73] Assignee: A.W.T. World Trade, Inc., Chicago, Ill.

[21] Appl. No.: 534,284

[22] Filed: Sep. 27, 1995

[51] Int. Cl.[6] .............................. B41M 1/12; F16B 5/06

[52] U.S. Cl. .............................. 403/325; 403/322; 101/115

[58] Field of Search .............................. 101/115, 126; 403/321, 322, 325

[56] References Cited

U.S. PATENT DOCUMENTS

| | | | |
|---|---|---|---|
| 1,423,933 | 7/1922 | Heatlie . | |
| 2,241,021 | 7/1939 | Riebe . | |
| 2,850,931 | 1/1957 | Conway . | |
| 3,486,441 | 12/1969 | Hillman et al. | 101/126 X |
| 3,955,832 | 5/1976 | Kalmanson | 403/322 X |
| 4,458,912 | 7/1984 | Bertonneau | 403/322 X |
| 4,753,164 | 6/1988 | Barnes et al. | 101/126 |
| 4,920,878 | 5/1990 | Harpold et al. | 101/126 X |
| 4,944,628 | 7/1990 | Hulden | 403/322 X |

FOREIGN PATENT DOCUMENTS

| | | |
|---|---|---|
| 124318 | 9/1900 | Germany . |

*Primary Examiner*—Anthony Knight
*Attorney, Agent, or Firm*—Silverman, Cass & Singer, Ltd.

[57] ABSTRACT

A pallet assembly for releasably installing or adjusting the position of the pallet on the printing station of a single or multi-color screen printing apparatus. The assembly includes a locking mechanism on the support member of the printing stations and track means on the pallet which can be cooperatively engaged in desired position of the pallet at the printing station for transferring a desired colored image to the workpiece on the pallet in a proper registered location on the workpiece. The locking mechanism is readily accessable for releasing and re-engaging the pallet on the support member.

6 Claims, 2 Drawing Sheets

QUICK RELEASE AND ADJUSTABLE PALLET ASSEMBLY FOR TEXTILE SCREEN PRINTING MACHINE

This invention relates generally to multi-color screen printing apparatus used to print single color or multi-color on workpieces, such as textile products, mounted on pallets with each pallet being positioned at each of several printing stations so that a printing screen can be pivoted downwardly by the operator on to the work piece and who thereafter manually or automatically reciprocates the squeegee across the screen in print and flood strokes to transfer a desired colored ink image to a designated registered location on the workpiece. More particularly, the invention relates to a novel pallet assembly for releasably installing and/or selectively adjusting the position of the pallet on the support member of the printing station at which the pallet is installed so that the desired colored ink image can be transferred to the workpiece in a proper registered location on the workpiece.

DESCRIPTION OF THE INVENTION

Single or multiple color textile printers generally are provided with a plurality of printing screens for accurately printing a plurality of single or differently colored images or patterns in desired registry on a single workpiece of textile material. A pattern also may include alphabetical characters, slogans or phrases. The printer includes printing stations corresponding in number to the number of screens. Each printing station includes a suitably mounted pallet on which the workpiece to be printed is placed. Each printing screen is prepared to transfer a selected colored ink image to the workpiece on the pallet in proper registry for completing the entire multi-colored image. For just a single color image, the image transferred would be in just one color, but proper registry on the workpiece is still a desired requirement. The printing screens are arranged in a spaced apart, radially extending formation and indexing means are provided on the printer for properly positioning a screen relative to the pallet of the printing station so that a selected color imprint can be transferred to the workpiece on the pallet. Critical to the efficient and proper operation of the printer is the positioning of the pallet for proper registry with the printing screen by means of which a desired imprint is transferred to the textile workpiece.

In the case of manual or automatic screen printing apparatus, the prior manner in which the pallet was mounted on the support member for the pallet employed mechanical fastening means, such as bolts or screws or multiple levers. In order to adjust the position of the pallet or to change to a different size pallet, it was required to manually disengage the fastening means and then adjust the pallet's position or replace the pallet and then replace the fastening means. This procedure was time consuming and a tedious one, especially in the case of a manually operated or automatic printer with a plurality of printing screens, such as, six or eight screens, such printers being available in this screen printing field.

The present invention eliminates the recourse to mechanical fasteners, such as bolts or the like, for installing a pallet on its associated support member. According to the invention, the pallet and associated support member comprise a quick release assembly for installing and disengaging a pallet without requiring mechanical tools or multiple levers. The quick release assembly is comprised of cooperating rail and track clamping means operable by means of a simple lever conveniently accessible to the operator. The same quick release assembly can be used with pallets of various configurations or vacuum beds and compatible with its associated support member already installed on the printer.

DESCRIPTION OF PREFERRED EMBODIMENT

Figure 1:
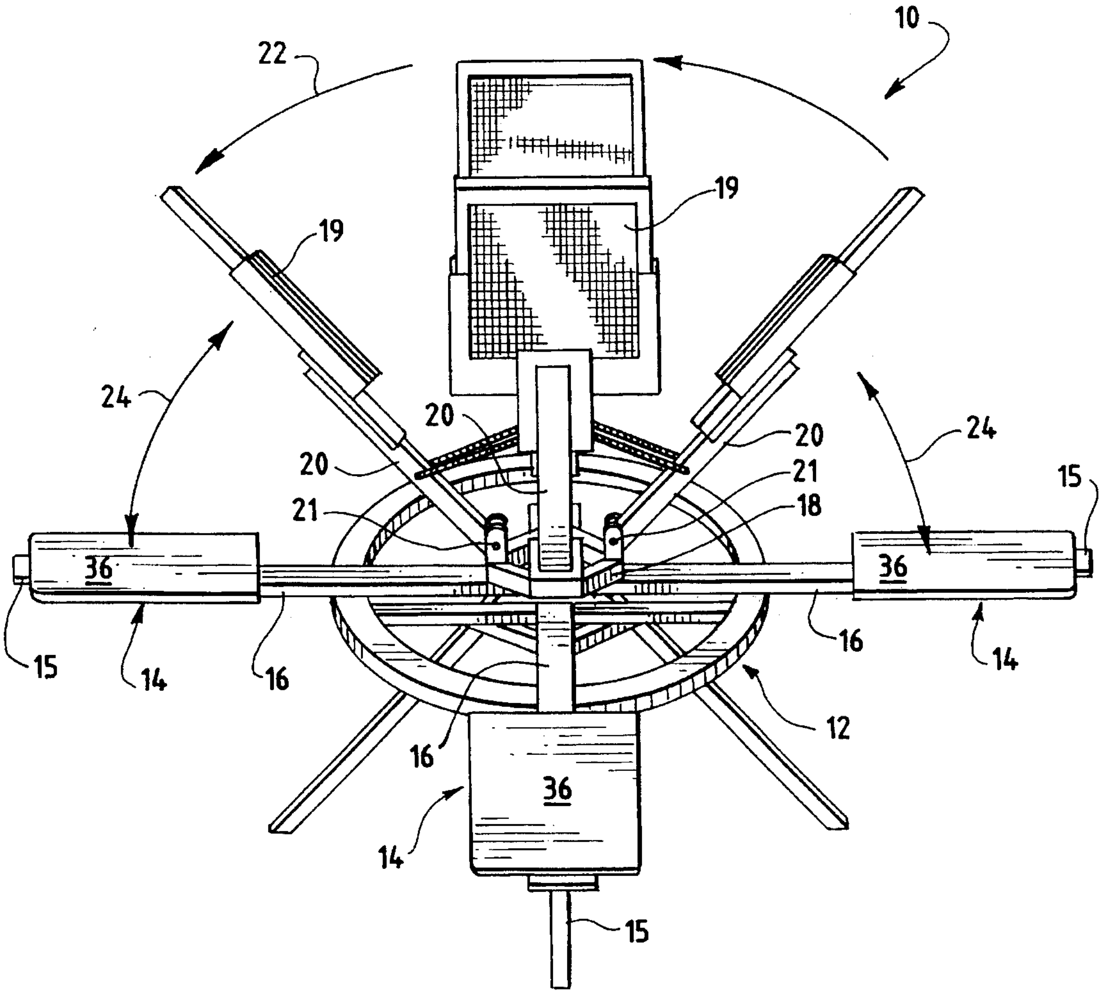
FIG. 1 is a diagrammatic perspective view of a single or multiple color textile screen printing machine on which the quick release pallet assembly embodying the invention is installed.

Referring to FIG. 1, a representative multi-color screen printer is designated generally by the reference character 10. For illustrative purposes, the printer 10 is a manually operable one supported on a pedestal designated generally by the reference character 12. It will be appreciated that the construction of the pedestal 12 can vary greatly for purposes of its function. The printer 10, as illustrated, provides three stationary work stations 14 each supported on the distal end 15 of a support bar 16 which extends radially outward from the axial center of the pedestal 12. Mounted on a rotatable turret 18 coaxial with the central axis of the pedestal 12 are three printing screens 19 each mounted at the distal end of the elongate pivotal support member 20. Each support member 20 is pivotally mounted on the turret 18, as indicated at 21, for movement in a vertical plane. The printing screens are rotatable by movement of turret 18 along a circular path indicated by the curved line 22 and are pivotal in a vertical direction relative to a work station 14 as indicated by the lines 24. Indexing means (not shown) are provided on the turret 18 for aligning a printing screen 19 with a work station 14, said means being conventional for the illustrated printer 10.

Each printing screen 19 is designed to print in desired registry a different color of its prepared image on the workpiece (not shown) which will be supported on the work stations 14. This will be accomplished by lowering a suitably indexed printing screen 19 on to the workpiece at the selected station 14, introducing the selected color printing ink at a suitable end of the screen, perhaps by a suitable flood bar/squeegee device (not shown) and then sweeping the squeegee across the length of the printing screen 19 for transferring the selected color image to the desired registry location on the workpiece. The operational sequence is repeated with the other two printing screens 19 suitably indexed for the appropriate work station 14 for transferring the desired color ink image in proper registry to each of the workpiece at the printing station of the printer.

It will be appreciated that in order to print such a multi-color image on the workpiece, each work station must be properly aligned and in proper registry with the printing screen with which it is mated for printing its color image. Such indexing requires proper positioning of the work station with its structural parts relative to the printing screen.

Each of the work stations is constructed to enable it to be properly positioned and aligned with a printing screen in accordance with the herein invention.

Figure 2:
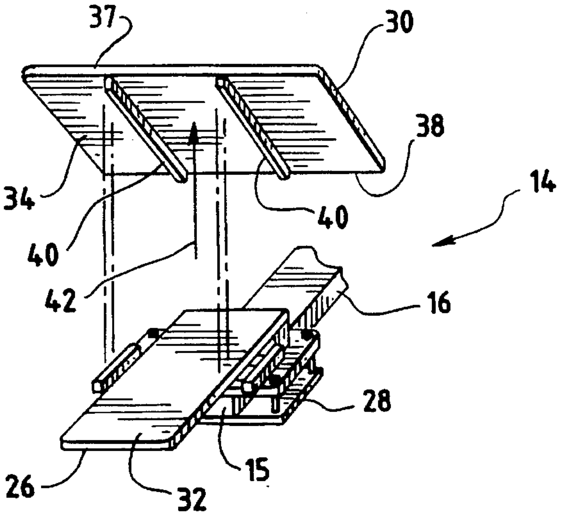
FIG. 2 is a fragmentary perspective view of the pallet assembly embodying the invention and showing the pallet separated from the support member for the pallet assembly on one of the color printing stations.

Referring to FIG. 2, the work station 14 is comprised of a rectilinear support plate or platform 26 mounted on the distal end 15 of the support bar 16 by means of the clamp fixture 28 and a pallet 30. As illustrated in FIG. 2, the upper exposed surface of platform 26 is designated 32 and the bottom surface of pallet 30 is designated 34. When assembled as seen in FIG. 1 for positioning a printing screen 19 on the opposite upper surface 36 of the pallet, visible in FIG. 1, the surfaces 32 and 34 will be matingly engaged. The position of the platform or plate 26 on the support bar 16 can be changed by adjusting the position of the fixture 28 on support bar 16 in a conventional manner as dictated by its structure illustrated in FIG. 2.

Figure 4:
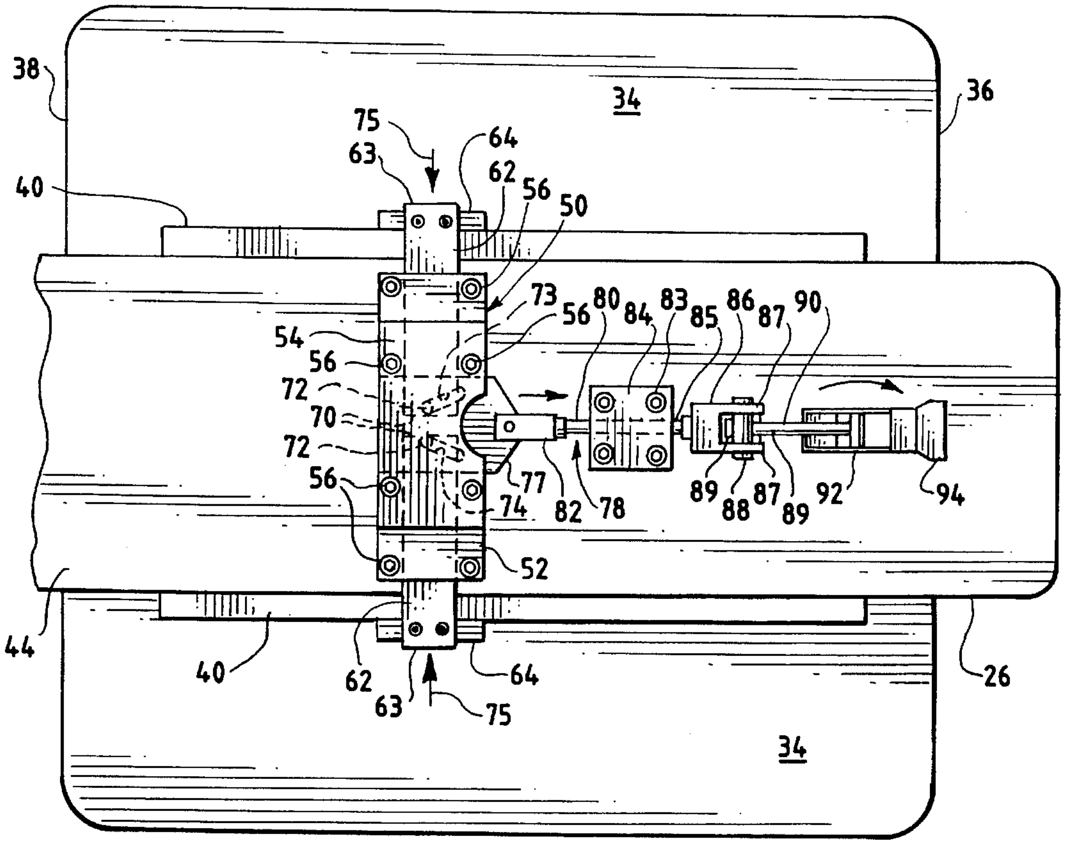
FIG. 4 is a bottom plan view of said assembly and partially in section to show the linkage for installing the pallet on the support member.

As illustrated in FIG. 2, the forward end of the pallet 30 is designated 37 and its opposite rear end is designated 38 (see FIG. 4). Extending from between said ends 37, 38 and medially along the length of bottom surface 34 is a pair of spaced apart, parallel rails 40 protruding a short distance from surface 34. As seen in FIG. 2, the pallet 30 has been lifted from the support plate 26 in the direction of the arrow 42.

Figure 3:
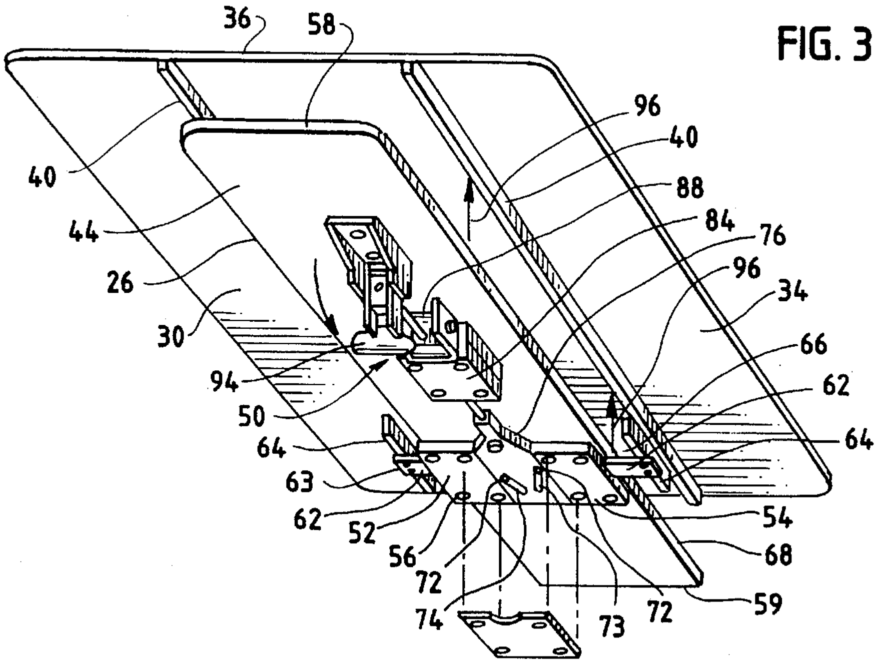
FIG. 3 is a bottom perspective view of said assembly showing the pallet separated from the support member and a cover plate withdrawn to show the linkage for permitting such separation.

Referring to FIGS. 3 and 4, secured to the bottom surface 44 of the support plate or platform 26 is a quick release clamping apparatus designated generally 50 which is constructed and arranged to be engaged with the rails 40 for releasably clamping the pallet 30 on the upper surface 32 of support plate 26. Thus engaged, the workpiece (not shown) will be positioned on the upper surface 36 of the pallet for the printing sequence. The position of the pallet relative to the platform 26 can be varied by unlocking the apparatus 50 and sliding the rails 40 forwardly or backwardly relative to the platform 26 and thereafter locking the pallet on the platform 26 in the selected position thereon.

Each clamping member includes an enlongate flat bar or arm 62 extending throughout the length of the undercut and protruding from each contiguous end of the undercut 60. Each arm 62 has an end 63 protruding outwardly of the housing and having flange 64 upstanding from said end 63 and located spaced from the contiguous housing 52 or 54 sufficiently to provide a track formation 66 between the proximate lateral edge 68 of the platform 26 and the flange 64. The width of the track formation 66 is dimensioned to accommodate a rail 40 therein for locking the pallet 30 on platform 26, as will be described hereinafter.

The opposite end 70 of each arm 62 protrudes outwardly of its associated housing 52 or 54 (FIG. 4). Contiguous each end 70 and located medially between opposing side edges of the arm is provided an upstanding pin 72. Each pin 72 is received in one of the slots 73 or 74 provided in the plate 76 slidably installed over the subtended ends 72 of the arms 62, as seen in FIG. 4. The slots 73 and 74 are angularly displaced one from the other so that the pins 72 can be moved in the slots 73 and 74 along angularly displaced paths which will result in reciprocal movement of the arms 62 and associated flanges 64 along the linear paths represented by the arrows 75 for locking and unlocking the rails.

The plate 76 is rectilinear in shape and has a tapered end 77 protruding laterally from the assembled housings 52 and 54. Attached to the tapered end 77 is an articulated linkage 78 for reciprocating the activator plate 76 to move the flanges relative to the edge 68.

The linkage 78 includes a slidable rod 80 connected at one of its ends to the end 77 of the plate 76 by the joint 82. The rod 80 is stabilized relative to the underside 44 of the platform 26 by the sandwiched plates 84 fastened to the platform 26 by suitable fasteners, the rod 80 being slidable in said sandwiched plates. The opposite end 85 of the rod 80 is secured to a yoke 86. The yoke 86 is bifurcated at an extremity thereof to provide the spaced apart arms 87 between which is mounted the shaft 88. Secured to the shaft 88 is one end 89 of the actuator rod 90. To the opposite end of the rod 90 is an off-center locking mechanism 92 designed to be actuated by the lever 94.

Referring to FIG. 4, the locking mechanism is illustrated with the lever 94 in a position parallel to the plane of the plate form 26 and the locking flanges 64 engaging the rails 40. The pins 72 are shown in the slots 73 and 74 at their closest proximity one to the other. This corresponds to the locked position of the pallet 30 on the platform 26. Referring to FIG. 3, the pins 72 are positioned in the slots at their remotest proximity one to other. This corresponds to the unlocked or released condition for the pallet 30 wherein the flanges 64 are spread away from the lateral edges of the platform so that the pallet can be withdrawn from the tracks 66 in the direction of the arrows 96. The lever 94 has been rotated downwardly in the direction of the arrow 98 to unlock the mechanism 50.

By manipulating the lever 94 as described, the position of the pallet 30 on the platform 26 is readily adjustable. Mechanical tools are no longer required either for mounting the pallet on the platform or adjusting its position on the platform or replacing a pallet to accommodate a special workpiece.

Minor variations in dimension of parts of the embodiment of the invention or substitution of equivalent functional parts is contemplated within the skill of artisans in the field of the invention and within the scope of the appended claims.

I claim:

1. A quick release locking mechanism for mounting a pallet on a support bed or platform of a single or multi-color screen printing apparatus, said locking mechanism adapted to be installed on the underside of the platform and said pallet having rail means protruding from its undersurface opposite its work surface on which a workpiece is to be carried for printing of a multi-color composite image thereon, said mechanism comprising:

A) a pair of housings adapted to be secured to a medial portion of said underside of the platform spaced apart and laterally aligned one with the other;

B) an enlongate linear member slidable in each housing and having opposite ends thereof protruding from opposite extremities of its associated housing, one of said protruding ends of each linear member having a locking member upstanding thereon to form a track-like space between the locking member and the associated housing for accommodating the rail means therein;

C) the opposite end of each elongate member having an upstanding pin member thereon;

D) a slidable plate positioned in said space between the housings and having a pair of angularly displaced slots therein each having a pin member slidably engaged therein; and E) articulated linkage means connected to said plate for sliding same in said space for reciprocating the pins in the slots whereby to selectively engage said locking members against the rail means and withdraw the locking members from engagement with said rail means thereby freeing the pallet from the platform.

2. The mechanism as described in claim 1 which includes an off-center mounted operating lever for manipulating said linkage.

3. The mechanism as claimed in claim 1 including a pallet having a pair of spaced apart, parallel rails depending from the bottom surface of the pallet and the quick release mechanism.

4. The mechanism as claimed in claim 3 including an off-center mounted operating lever for manipulating said linkage.

5. The mechanism of claim 4, in which said locking members are constructed and arranged to extend beyond the opposite lateral edges of the platform.

6. The mechanism of claim 5 in which said rails are locked between said locking members and said opposite lateral edges of the platform in their locked condition on the platform.

* * * * *